United States Patent [19]
Dahlstrom

[11] 3,930,416
[45] Jan. 6, 1976

[54] LAMINATED DRIVE ARMS FOR SPEED REDUCER
[75] Inventor: Arvid Dahlstrom, Chicago, Ill.
[73] Assignee: Dahltron Corporation, Oak Brook, Ill.
[22] Filed: Sept. 16, 1974
[21] Appl. No.: 506,538

[52] U.S. Cl................................ 74/125.5; 74/116
[51] Int. Cl.² ............................................ F16H 27/10
[58] Field of Search ....... 74/55, 63, 116, 120, 125.5

[56] References Cited
UNITED STATES PATENTS

| | | |
|---|---|---|
| 1,658,224 | 2/1928 | Carrey .................................. 74/55 |
| 3,256,758 | 6/1966 | Medesha ............................. 74/125.5 |
| 3,557,631 | 1/1971 | Dahlstrom ......................... 74/125.5 |
| 3,772,926 | 11/1973 | Sidhu .................................. 74/116 |

Primary Examiner—Kenneth W. Sprague
Assistant Examiner—James C. Yeung
Attorney, Agent, or Firm—Edward D. Gilhooly

[57] ABSTRACT

Drive arm of a speed reducer is provided with an aperture capable of carrying a various number of clutch means. Removable separates are provided between the arms having apertures corresponding at least in part with the arm apertures, thus, different sized clutches can be employed depending on the amount of torque to be transferred.

13 Claims, 6 Drawing Figures

U.S. Patent   Jan. 6, 1976   3,930,416
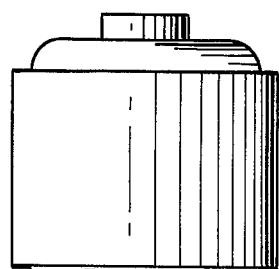
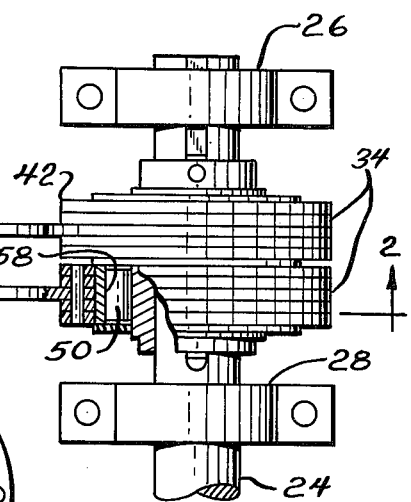
Fig. 1
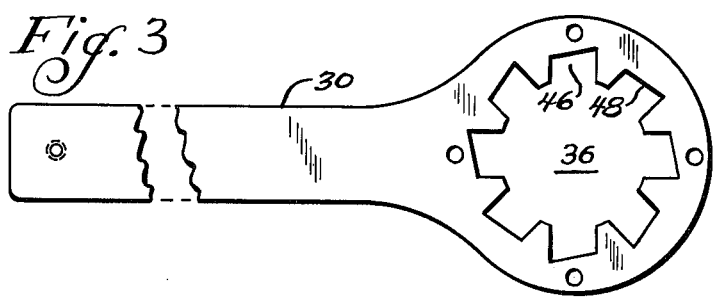
Fig. 3
Fig. 2
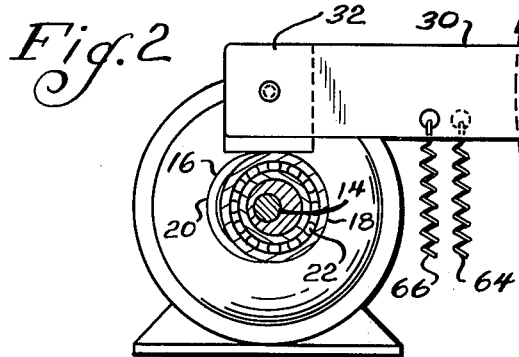
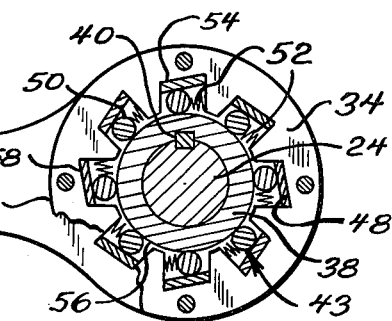
Fig. 4
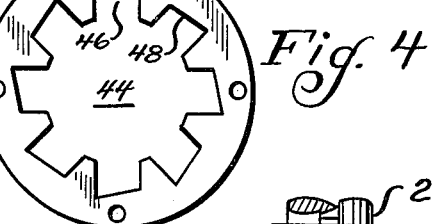
Fig. 5   Fig. 6

LAMINATED DRIVE ARMS FOR SPEED REDUCER

This invention relates to speed reduction mechanisms and more particularly to a speed reduction mechanism having force transfer arms including a series of individual components.

In the area of speed reduction assemblies there are innumerable devices for juncture with a high-speed shaft that reduce the speed of the high-speed shaft to the desired rate. A substantial number of such devices employ gear means, others employing belt means etc. Special reference should be made to my prior U.S. Pat. No. 3,557,631 reissued as U.S. reissue patent Re 28122 and to my co-pending application Ser. No. filed simultaneously herewith. The invention of the present application is an improvement thereof.

In order to provide flexibility and vary the distribution of forces being transferred from a high-speed shaft of a motor to an output shaft, the force transfer arm of the invention is provided with a series of separation means. Each of these separation means have extending therethrough machined channels wherein the clutch assemblies can be placed. The device disclosed herein is capable of handling various magnitudes of high torque transmission through the use of more clutching assemblies being placed in the channels. Moreover, as an additional improvement, to cut down the noise pollution being generated between the force transfer arm and the highspeed input shaft during operation the input shaft is provided with a series of ball bearing assemblies and the arm is provided with a cushioning means in the area of contact.

It is therefore an object of this invention to provide an arm assembly adaptable to transfer different amounts of torque.

Still another object of this invention is to provide arm means capable of securement to various numbers of clutch members.

Still another object of this invention is to provide a speed reduction mechanism wherein noise pollution is reduced.

Another object of this invention is to provide the eccentric of the input shaft with a ball bearing assembly and the force transfer arm with a cushioning means whereby wear and noise pollution and therebetween is substantially reduced.

Another object of this invention is to provide a force transfer assembly and clutch assembly which can be increased or decreased in size depending on the amount of force being transferred.

These and other objects have advantages of this invention will more fully appear from the following description, made in connection with the accompanying drawings wherein black reference characters refer to the same or similar parts throughout the several views and in which:

FIG. 1 is a plain top view partially broken away of the speed reducing mechanism according to the present inventions;

FIG. 2 is an elevational view looking in the direction of the arrows 2 — 2 of FIG. 1;

FIG. 3 is a partial side view of a single arm means;

FIG. 4 is a side view of a representative separation member;

FIG. 5 is a prospective view of part of the clutch assembly; and is

FIG. 6 is a partial view of the output shaft and clutch assembly showing the laminated nature of the arm and separator means.

The improved speed reducing mechanism means 10 is driven by an electric motor means 12 in the preferred embodiment. As is evident any type of driving means could be employed. It is essential however, that the driving means 12 have an output shaft means such as 14. As shown herein output shaft means 14 is provided with first and second eccentric means 16 and 18. It should be noted that any number of eccentric means can be provided but they must be equally distributed about the output shaft means 14. That is, if 2 eccentrics are employed they must be 180 degrees out of phase, if 3 eccentrics were employed they would be 120 degrees out of phase. If 4 eccentrics means were employed they would be 90 degrees out of phase etc. First and second ball bearing means 20 and 22 are provided for each eccentric. In the preferred embodiment the inner race of the ball bearing means is secured to the eccentric such that shaft means 14 can rotate while the outer race of the bearing will remain generally motionless or at least be capable of achieving a motionless position.

An output shaft means 24 is provided to transfer the speed at a reduced rate to the conveyer etc which it is the object to drive. The output shaft may or may not be provided with its own series of bearing set means such as 26 and 28. It will often be possible to have the speed reduction assemblage carried by bearing sets which are an integral part of the apparatus to which the reduced speed is being delivered.

Mounted between the input and output assemblages is a speed reducing mechanism means 10 which includes: arm means 30 having first end means 32 and second end means 34, said second end means being provided with an aperture means 36 as will hereafter be more fully explained. The output shaft means 24 is the preferred embodiment journals said second end means 34. Adjacent and generally surrounding said output shaft means 24 is a sleeve or clutched member 38 removably secured by key means 40. Referring to FIGS. 1 and 4 the load bearing separation means 42 are shown. In FIG. 1 two such members are shown on either side of the arm means 30 being positioned adjacent the second end means 34. Each of these separation means 42 are provided with an aperture means 44 which must in part correspond to the aperture present in the arm means which it is adjacent to.

Referring to FIG. 2 wherein is shown a preferred emodiment of the invention hereunder consideration. It will be noted that the apertures of both the separation means 42 and the arm means 30 correspond. Each of these aperture means includes tranversely extending channel means 46, said members being slightly cocked such that a ramp surface means 48 is created. That is the diameter of the aperture 44 increases in each channel means 48 as one moves in a clockwise manner. It should also be noted that each of the channel means 48 is substantially identical and angled in the same direction. As shown in FIG. 3 and FIG. 4, 8 channel means are shown as being provided in the separation means as well as as the arm means. As will be hereafter explained the number of these channel means can be increased or decreased depending on the amount of torque which it is desired to transmit.

Situated in the channel means 46 is a roller sprag means 50. The spray means 50 is a generally cylindrical member fully rolling within the given channel means. A spring means 52 continuously urges the sprag means 50 toward the shallower side of the channel means 46. As is apparent when the roller sprag means 50 is pinched between the bottom wall means 54 and the outer surface means 56 of the clutched member 43 whereby force is transferred therebetween. As shown in FIG. 2 a very tough, durable steel plate means 58 is provided adjacent the bottom surface of each channel means. This provides better wear characteristics for the assembly.

As is apparent the more roller sprag members which are provided the larger the amount of torque which will be transferred from the input shaft to the output shaft. Additionally if the size or length of the roller sprags of a given number was increased more torque could be transferred. Depending on circumstances a given arm member 30 could be provided with a higher number of channel means 46. Thereafter plate or separation members such as 42 could be provided with any number of channel means depending on the amount of torque which it was desired to transfer. That is arm member 30 could be provided with nine channels and if only low amounts of torque were to be transferred the separating means plate means 42 would only be for example provided with four channel means wherein could be situated the sprag members to transfer the necessary torque. Thereafter by pulling some of or one or more of the sprag members out the torque could be still further controlled. Additionally, by increasing or decreasing the separation plate members and thus allowing for larger or smaller sprag members to be employed the amount of torque transferred could also be controlled. As is apparent with this assemblage of arm means and separation means, with various numbers of channel means and of sprag means of various lengths and diameters a varying amount of torque transfer can be provided. The flexibility and combinations being employable in any number of situations.

In operation first end means 32 of arm means 30 is held by a spring means such as 64 or 66 against the outer race surface of bearing means 20. A cushioning material is provided across the area of possible contact to avoid any noise pollution which might be generated by the metal to metal contact. It is stated previously such noise pollution would be minimised by the fact that the outer race has literally no movement to it. As the eccentrics come around the arms are alternately lifted and then allowed to sink back in a very rapid chopping motion. Each of said motions being of a very small distance but with tremendous rapidity. Referring to FIG. 2 it would become apparent that as arm means 30 is raised the roller sprag 50 will move slightly toward to the narrow end of the channel where it will pinch and transfer a small amount of movement to the clutch member and in turn to the output shaft. As is apparent the amount of movement transferred to the output shaft in a given arm stroke is very small yet when multiplied by several hundred strokes per minute causes the shaft to rotate in an almost steady continuous manner.

Additional features such as the provision of eccentrics capable of generating more movement or amplitude and as a result more torque being transferred to output shaft means 24 may also be provided. In such circumstances when high torque loads are being transferred the number of the arm means 30 can be doubled up as shown in FIG. 6. Such increasing of the torque carrying ability of the arm means is limited only by the other elements involved in the assemblage.

As is apparent there has been provided an improvement on a speed reducing mechanism wherein the torque being transferred from the input shaft to the output shaft can be tailored to the needs of the overall operation. Such tailoring is controlled by the number of force transmitting sprag means and their sizes. This in turn is determined by the number of channels provided in the separation means as well as the arm means. Additional features include doubling up of arm members to allow heavier torque loads to be transferred, providing the eccentrics with ball bearing assemblies. Additionally noise absorbing means are provided between the arm and the outer race ball bearing assembly such that the possibility of noise pollution therebetween is substantially lessened.

While there has been described what is at present considered to be the preferred embodiments of the invention, it will be understood that various modifications may be made therein, and it is intended to cover in the appended claims all such modifications as follows in the true spirit and scope of the invention.

What is claimed is:

1. A speed reducer mechanism for drivably connecting a rotating power shaft to a driven shaft comprising:
   motion inducing means coupled to said power shaft;
   at least one arm means having a pair of opposed planar side surfaces and a pair of opposed edge surfaces disposed therebetween;
   said at least one arm means including a first end section engaging said motion inducing means at one of said edges and a second end section adapted to be operatively coupled to the driven shaft;
   at least one separator element being removably positioned adjacent one of said sides of said second end section;
   said separator element having two opposed flat faces one of which is in contiguous contact with one of said sides;
   said at least one separator element and arm means having corresponding transversely extending aperture means; and
   clutch means carried in said aperture means lying in confronting relationship to each other and in concentric relationship to the longitudinal axis of said driven shaft.

2. The speed reducer mechanism of claim 1 wherein said aperture means includes generally rectangular shaped channel means having an open side means and a load bearing side means.

3. The speed reducer mechanism of claim 2 wherein said load bearing side means includes a sleeve of a material having a greater modulus of elasticity than said arm means and separator element.

4. The speed reducer mechanism of claim 1 wherein: said arm means includes a series of unitary laminated members, and each of said arm means is operatively coupled to said motion inducing means for effecting intermittent rocking movement of said arm means upon rotation of said power shaft.

5. The speed reducer mechanism of claim 1 wherein said motion inducing means is an eccentric means.

6. The speed reducer mechanism of claim 5 wherein said eccentric means incudes a non-rotatable sleeve, an internal eccentrically mounted rotatable element and journalled ball bearing means mounted therebetween.

7. The speed reducer mechanism of claim 1 wherein: said first end means of said arm means includes a sound reducing means adjacent said motion reducing means during engagement.

8. The speed reducer mechanism of claim 1 wherein: said at least one arm means includes a plurality of arm means.

9. The speed reducer mechanism of claim 8 wherein: said at least one separator element is situated in contiguous contact between a pair of said plurality of arm means.

10. The speed reducer mechanism of claim 9 wherein said separator means includes a series of laminated plates.

11. The speed reducer mechanism of claim 10 wherein each said arm means includes a series of laminated members.

12. The speed reducer mechanism of claim 9 further including at least one outer separator element positioned in contiguous contact on opposite sides of said arm means than between said adjacent pairs.

13. The speed reducer mechanism of claim 12 further including securement means maintaining said plurality of arms, said at least one separator element and said at least one outer separator element in laminated position relative to the output shaft.

* * * * *

UNITED STATES PATENT OFFICE
CERTIFICATE OF CORRECTION

Patent No. 3,930,416      Dated January 6, 1976

Inventor(s) Arvid Dahlstrom

It is certified that error appears in the above-identified patent and that said Letters Patent are hereby corrected as shown below:

Column 2, line 37, "is" should be -- in --;

Column 2, line 67, "spray" should be -- sprag --.

Signed and Sealed this sixth Day of April 1976

[SEAL]

Attest:

RUTH C. MASON
*Attesting Officer*

C. MARSHALL DANN
*Commissioner of Patents and Trademarks*